US007020805B2

(12) United States Patent
Talagala et al.

(10) Patent No.: US 7,020,805 B2
(45) Date of Patent: Mar. 28, 2006

(54) EFFICIENT MECHANISMS FOR DETECTING PHANTOM WRITE ERRORS

(75) Inventors: Nisha D. Talagala, Fremont, CA (US); Brian Wong, Palo Alto, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 548 days.

(21) Appl. No.: 10/222,074

(22) Filed: Aug. 15, 2002

(65) Prior Publication Data

US 2004/0034817 A1    Feb. 19, 2004

(51) Int. Cl.
*G06F 11/00* (2006.01)
(52) U.S. Cl. ....................... 714/42
(58) Field of Classification Search ............... 714/42
See application file for complete search history.

(56) References Cited

U.S. PATENT DOCUMENTS

| 5,197,148 | A | * | 3/1993 | Blount et al. ............... 714/5 |
| 5,201,044 | A | * | 4/1993 | Frey et al. ................. 714/20 |
| 5,206,939 | A | | 4/1993 | Yanai et al. |
| 5,720,026 | A | | 2/1998 | Uemura et al. |
| 5,796,934 | A | * | 8/1998 | Bhanot et al. ................ 714/4 |
| 5,889,934 | A | | 3/1999 | Peterson |
| 5,995,308 | A | | 11/1999 | Assouad et al. |
| 6,009,542 | A | | 12/1999 | Koller et al. |
| 6,343,343 | B1 | | 1/2002 | Menon et al. |
| 6,347,359 | B1 | | 2/2002 | Smith et al. |
| 6,397,309 | B1 | | 5/2002 | Kedem et al. |
| 6,408,416 | B1 | | 6/2002 | Morley et al. |
| 6,418,519 | B1 | | 7/2002 | Cadden et al. |
| 6,467,060 | B1 | | 10/2002 | Malakapalli et al. |
| 6,484,185 | B1 | * | 11/2002 | Jain et al. ................. 707/203 |
| 6,553,511 | B1 | | 4/2003 | DeKoning et al. |
| 6,584,544 | B1 | | 6/2003 | Morley et al. |
| 6,587,962 | B1 | * | 7/2003 | Hepner et al. ............... 714/19 |
| 6,606,629 | B1 | | 8/2003 | DeKoning et al. |
| 6,629,273 | B1 | * | 9/2003 | Patterson .................. 714/718 |
| 6,684,289 | B1 | | 1/2004 | Gonzalez et al. |
| 6,687,791 | B1 | * | 2/2004 | Morrison ................... 711/130 |
| 6,728,922 | B1 | | 4/2004 | Sundaram et al. |
| 6,874,001 | B1 | * | 3/2005 | Narang et al. ............. 707/203 |
| 6,880,060 | B1 | * | 4/2005 | Talagala et al. ............ 711/170 |
| 2003/0070042 | A1 | | 4/2003 | Byrd |
| 2003/0140299 | A1 | | 7/2003 | Duncan et al. |
| 2003/0145270 | A1 | | 7/2003 | Holt et al. |
| 2003/0163777 | A1 | | 8/2003 | Holt |
| 2003/0188216 | A1 | * | 10/2003 | Elko et al. ................... 714/1 |
| 2003/0221155 | A1 | | 11/2003 | Weibel et al. |
| 2004/0123032 | A1 | | 6/2004 | Talagala et al. |
| 2004/0153746 | A1 | * | 8/2004 | Talagala et al. .............. 714/8 |

OTHER PUBLICATIONS

EMC, "The EMC CLARiiON Data Integrity Difference", (May 2001),pp 1-11.

* cited by examiner

*Primary Examiner*—Robert Beausoliel
*Assistant Examiner*—Michael Maskulinski
(74) *Attorney, Agent, or Firm*—Blakely, Sokoloff, Taylor & Zafman LLP

(57) ABSTRACT

A method for detecting a phantom write error in a data storage system is described. In one embodiment, upon receiving a read command pertaining to a data block stored on a storage medium, two version identifiers associated with the data block are compared. A first version identifier is stored within the data block and a second version identifier is stored outside of the data block. If the version identifiers do not match, the possible occurrence of a phantom write error is detected.

30 Claims, 8 Drawing Sheets

EFFICIENT MECHANISMS FOR DETECTING PHANTOM WRITE ERRORS

FIELD OF THE INVENTION

This invention relates generally to data storage arrays and more particular to a mechanism for detecting phantom write errors in a data storage system.

BACKGROUND OF THE INVENTION

Large-scale data storage systems today typically include an array of disk drives and one or more dedicated computers and software systems to manage data. A primary concern of such data storage systems is that of data corruption and recovery. Data corruption occurs where the data storage system returns erroneous data and has no indication that the data is wrong.

One example of data corruption results from a phantom write error. A phantom write error occurs when a data storage system reports that a write command has been executed but fails to execute it. Such data corruption may occur for several reasons. For example, a write cache error can cause a reported write to never reach a disk medium. In another example, a block of data can be written to the wrong address due to a malfunction of a component of the data storage system. This results in corruption of data at two locations: it leaves stale data at the original location and replaces valid data at the new location with data that is not expected to be stored at this new location. The first of these two errors is a phantom write error.

Errors like phantom write errors are "silent", i.e., the data storage system does not realize that the error has occurred. Silent data corruption is particularly problematic. For example, when an application requests data and gets the wrong data this may cause the application to crash. Additionally, the application may pass along the corrupted data to other applications. If left undetected, these errors may have disastrous consequences (e.g., irreparable undetected long-term data corruption).

The problem of detecting silent data corruption is addressed by creating integrity metadata such as a checksum for each data block. A checksum is a numerical value derived through a mathematical computation on the data in a data block. When data is stored, a numerical value is computed and associated with the stored data. When the data is subsequently read, the same computation is applied to the data. If an identical checksum results, then the data is assumed to be uncorrupted.

A phantom write error occurs when the data storage system fails to write the entire block of data to the requested location, leaving data at the requested location unchanged, as well as a corresponding checksum stored with the data. Accordingly, a checksum cannot be used to detect a phantom write error unless the checksum is stored separately from the data. However, such separated metadata would create a significant additional expense. Specifically, each read command would require at least two physical I/O operations (i.e., a data read and a metadata read) and each write command would require at least four physical I/O operations (i.e., a data write and three operations to update the metadata including read, modify and write). These read/modify/write operations are required because integrity metadata is typically much smaller than a data block, and typical storage systems today only perform I/O operations in integral numbers of data blocks. If the data storage system contains redundant arrays of disk drives under RAID (redundant arrays of inexpensive disks) 1 or RAID 5 architectures, these additional operations can translate into many extra disk I/O operations.

The problem with the additional I/O operations can be ameliorated by caching the integrity metadata in memory of the data storage system. However, the integrity metadata is typically 1–5 percent of the size of the data. For example, typical storage systems using block-based protocols (e.g., SCSI) store data in blocks of 512 bytes in length. Such data blocks would require 4–20 bytes of metadata for each data block (i.e., 10–50 MB of metadata for 1 GB of user data). Thus, it is not practical to keep all of the integrity metadata in memory. Furthermore, even if it were possible to store the metadata in memory, metadata updates would need to be stored in a non-volatile storage device and would, therefore, require either additional disk I/O operations or non-volatile memory of the substantial size.

SUMMARY OF THE INVENTION

The present invention relates to various aspects for detecting phantom write errors in a data storage system.

In one aspect of the invention, an exemplary method of the invention is provided for detecting a phantom write error when executing a read command pertaining to a data block stored on a storage medium. In this method, upon receiving a read command pertaining to the data block, two version identifiers associated with the data block are compared. The first version identifier is stored within the data block and the second version identifier is stored outside of the data block. If the version identifiers do not match, the possible occurrence of a phantom write error is detected.

According to another aspect of the present invention, a method is provided for maintaining version identifiers that allow the detection of phantom write errors. Each data block is associated with two version identifiers, with the first version identifier being stored within the data block and the second version identifier being stored outside of the data block. In this method, upon receiving a write command pertaining to the data block, a next version value associated with the data block is determined and the version value is written to each version identifier during the execution of the write command. If a phantom write error occurs during the execution of the write command, the next version value will be written to the version identifier stored outside of the data block but not the version identifier stored within the data block. This mismatch between the two version identifiers will indicate the possible occurrence of the phantom write error.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

As will be discussed in more detail below, an embodiment of the present invention provides a method for detecting phantom write errors in a data storage system. In accordance with one embodiment, each data block stored on a storage medium is associated with two version identifiers. The first version identifier is stored within the data block and the second version identifier is stored outside of the data block. Upon receiving a read command pertaining to the data block, the two version identifiers are compared. If the version identifiers do not match, the possible occurrence of a phantom write error is detected.

In another embodiment of the present invention, a method is provided for maintaining version identifiers that allow the detection of phantom write errors. As described above, each data block is associated with two version identifiers, with the first version identifier being stored within the data block and the second version identifier being stored outside of the data block. Upon receiving a write command pertaining to the data block, a next version value associated with the data block is determined and this version value is written to each version identifier during the execution of the write command. If a phantom write error occurs during the execution of the write command, the next version value will be written to the version identifier stored outside of the data block but not the version identifier stored within the data block. This mismatch between the two version identifiers will indicate the possible occurrence of the phantom write error.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1A:
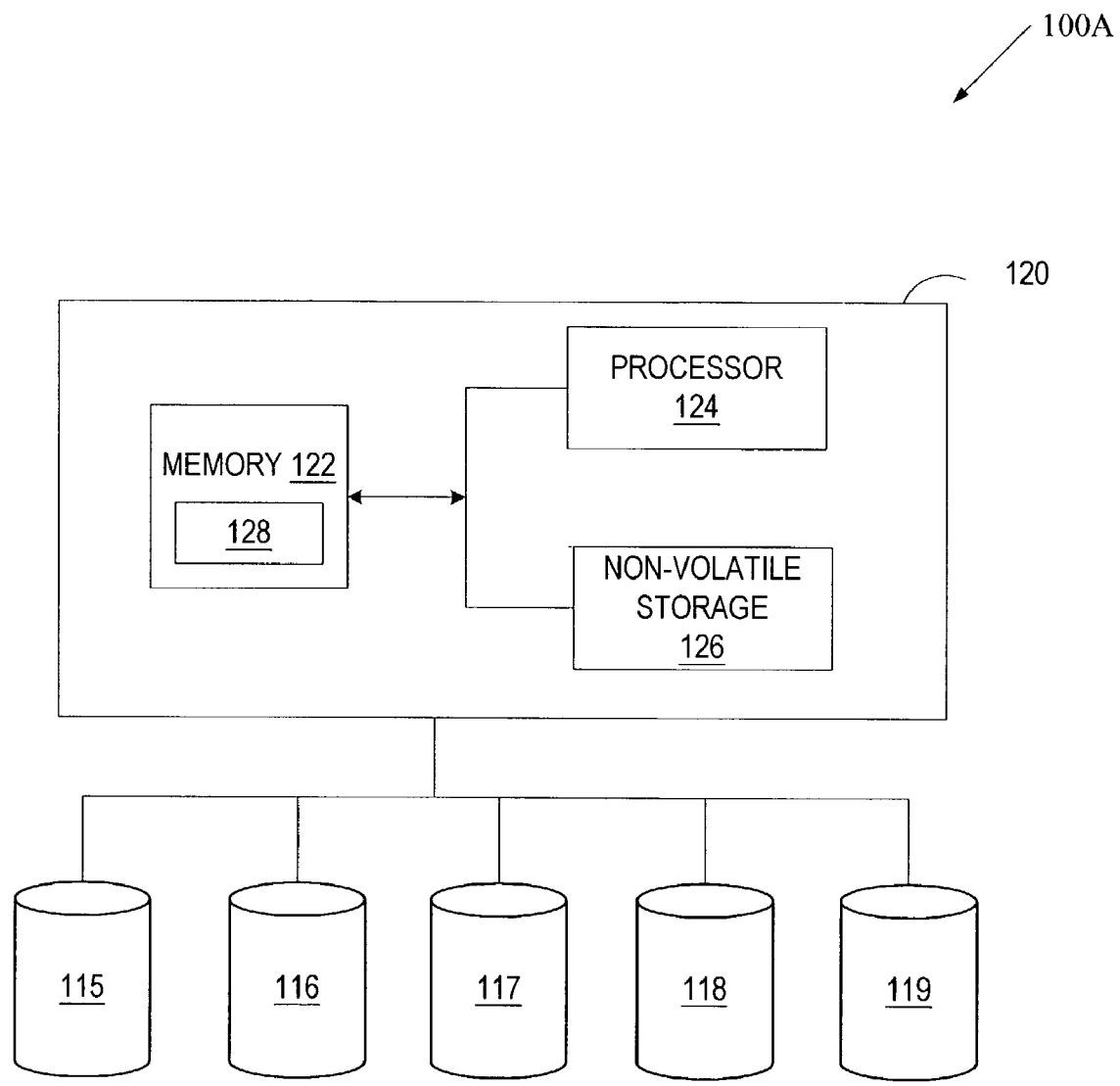
FIGS. 1A—and 1B illustrate exemplary data storage systems in accordance with alternative embodiments of the present invention.

FIG. 1A illustrates an exemplary data storage system in accordance with one embodiment of the present invention.

Referring to FIG. 1A, a data storage system 100A contains a disk array composed of one or more sets of storage devices (redundancy groups) such as disks 115–119 that may be magnetic or optical storage media or any other fixed-block storage media, such as memory cells. Data in disks 115–119 is stored in blocks (e.g., data blocks of 512-bytes in lengths).

Data storage system 100A also contains an array controller 120 that controls the operation of the disk array. Array controller 120 provides the capability for data storage system 100A to perform tasks and execute software programs stored within the data storage system. Array controller 120 includes one or more processors 124, memory 122 and non-volatile storage 126 (e.g., non-volatile access memory (NVRAM), flash memory, etc.). Memory 122 may be random access memory (RAM) or some other machine-readable medium, for storing program code (e.g., software for performing any method of the present invention) that may be executed by processor 120. The machine-readable medium may include a mechanism that provides (i.e., stores and/or transmits) information in a form readable by a machine such as a computer or digital processing device. For example, a machine-readable medium may include a read only memory (ROM), random access memory (RAM), magnetic disk storage media, optical storage media, flash memory devices, etc. The code or instructions may be represented by carrier-wave signals, infrared signals, digital signals, and by other like signals. Non-volatile storage 126 is a durable data storage area in which data remains valid during intentional and unintentional shutdowns of data storage system 100A.

In one embodiment, controller 120 includes a phantom write detection module 128 for facilitating the detection of phantom write errors within the disk array. As described above, a phantom write error occurs when a data storage system reports that a write command has been executed but fails to execute it, leaving stale data at the original location. Module 128 may be implemented in hardware, software, or a combination of both. In one embodiment, software module 128 is stored in memory 122.

In one embodiment, module 128 is responsible for detecting a possibility of a phantom write error using a version identifier. Specifically, each data block within the disk array is associated with two version identifiers. The first version identifier is stored within the data block, and the second version identifier is stored outside of the data block. In one embodiment, the second version identifier is stored in a data structure residing in a non-volatile storage 126. The data structure may be represented as a database, a file, a bitmap, or any other data structure. In another embodiment, the second version identifier is stored in a data structure residing in the disk array. In this embodiment, the data structure is organized in such a way that each version identifier is stored separately from its associated data block. In this embodiment, the second version identifier may be cached in memory 122 to minimize disk I/O operations. Module 128 detects the possible occurrence of a phantom write error by comparing the two version identifiers associated with the data block and determining that they do not match.

In another embodiment, module 128 is responsible for maintaining version identifiers that allow the detection of phantom write errors. That is, upon receiving a write command pertaining to a data block, module 128 determines a next version value for the data block and writes the next version value to both version identifiers when the write command pertaining to the data block is executed. If a phantom write error occurs during the execution of the write command, the next version value will be written to the version identifier stored outside of the data block but not the version identifier stored within the data block. This mismatch between the two version identifiers will indicate the possible occurrence of a phantom write error.

Module 128 may or may not reside in controller 120. Specifically, module 128 may be implemented anywhere within the block-based portion of the I/O datapath. The datapath referred to herein represents any software, hardware, or other entities that manipulate data in block form (i.e., from the time the data enters block form on write operations to the point where the data leaves block form on read operations). The datapath extends from the computer that reads or writes the data (converting it into block form) to the storage device where the data resides during storage. For example, the datapath may include software modules such as volume managers that stripe or replicate the data, the disk arrays that store the data blocks, the portion of the file system that manages data in blocks, the network that transfers the blocks, etc.

Figure 1B:
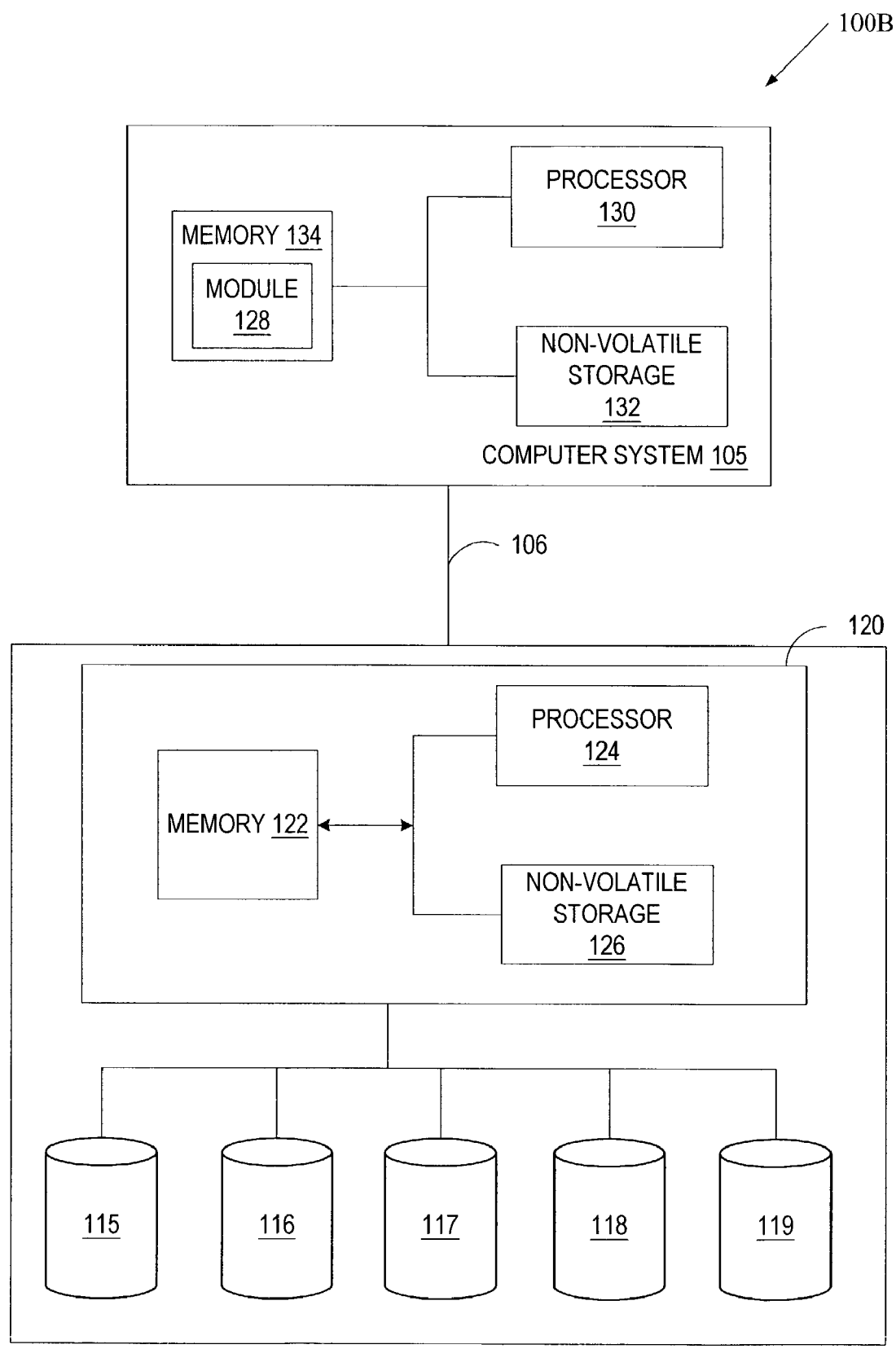

FIG. 1B illustrates an exemplary data storage system 100B, in which module 128 is implemented outside of controller 120, in a computer system 105, according to some embodiments of the present invention. Computer system 105 may be a server, a host or any other device external to controller 120 within the datapath. Users of data storage system 100B may be connected to computer system 105 directly or via a network such as a local area network or a storage array network. Controller 120 communicates with computer system 105 via a bus 106 that may be a standard bus for communicating information and signals and may implement a block-based protocol (e.g., SCSI or fiber channel). Array controller 120 is capable of responding to commands from computer system 105.

In one embodiment, computer 105 includes non-volatile storage 132 (e.g., NVRAM, flash memory, etc.) that stores separated version identifiers associated with data blocks of disks 115–119. Alternatively, these version identifiers are stored on disk and can be cached in memory 134. In one embodiment, memory 134 stores software module 128 and other program code that can be executed by processor 130. Memory 134 may be RAM or some other machine-readable medium. The machine-readable medium may include a mechanism that provides (i.e., stores and/or transmits) information in a form readable by a machine such as a computer or digital processing device. For example, a machine-readable medium may include a read only memory (ROM), random access memory (RAM), magnetic disk storage media, optical storage media, flash memory devices, etc. The code or instructions may be represented by carrier-wave signals, infrared signals, digital signals, and by other like signals.

Figure 2:
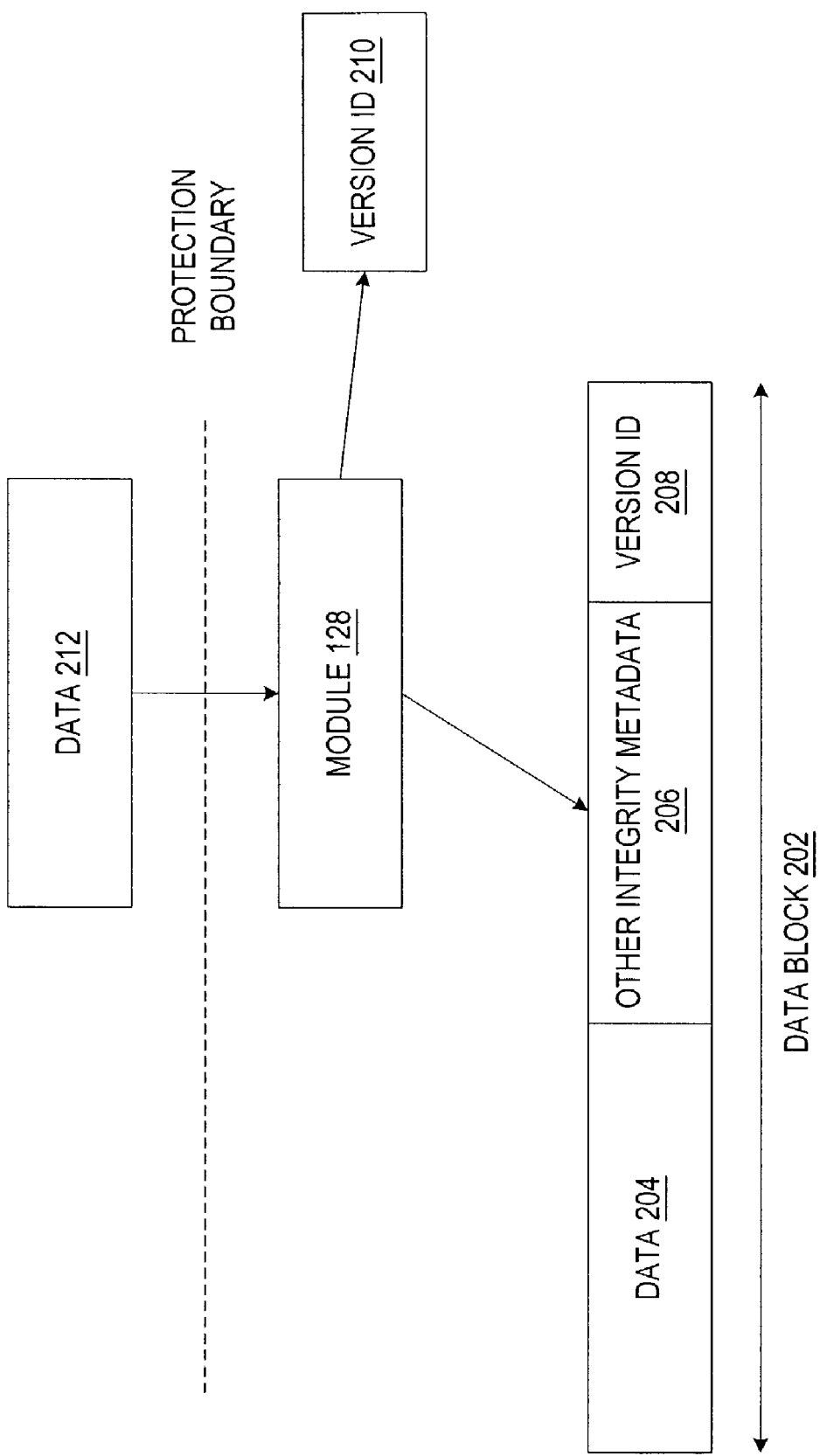
FIG. 2 illustrates one embodiment of a mechanism for detecting phantom write errors.

FIG. 2 illustrates one embodiment of a mechanism for detecting phantom write errors. As shown in FIG. 2, a data block 202 includes data 204 and integrity metadata composed of a version identifier (ID) 208 and other integrity metadata 206 (e.g., a checksum). Data block 202 is also associated with version ID 210 that is stored outside of data block 210. In one embodiment, version ID 210 is stored in a non-volatile storage such as NVRAM or flash memory. Alternatively, version ID 210 is stored on a disk and may be cached in volatile memory. The integrity metadata 206 may protect both the data 204 and the version ID 208.

When a command to write data 212 to data block 202 is issued, module 128 determines a next version value for data block 202, and writes this next version value to version ID 210 and version ID 208 while writing data 212 to data block 202. If the execution of write command to data block 202 fails (i.e., a phantom write error occurs), the next version value will be written to version ID 210 but not version ID 208, resulting in mismatch between version IDs 208 and 210. When data 204 is subsequently read, this mismatch will indicate the possible occurrence of a phantom write error. As will described in more detail below, when the mismatch is detected, there is a high likelihood that the mismatch was caused by a phantom write error. In one embodiment, module 128 considers each mismatch to be caused by a phantom write error. Alternatively, module 128 performs further analyses to determine the actual cause of the mismatch as will be described in greater detail below.

In one embodiment, each of version IDs 208 and 210 is a one-bit field. Such size is likely to result in a cumulative space of version IDs 210 that is sufficiently small to be kept in NVRAM or other fast non-volatile storage. For example, for common data blocks of 512-bytes in length, 1 TB of user data will require 256 MB of version identifier data. One-bit version IDs allow the detection of a single occurrence of a phantom write error or an odd number of consecutive occurrences of a phantom write error (e.g., three consecutive occurrences of the error). However, one-bit version IDs cannot be used to detect an even number of consecutive occurrences of a phantom write error (e.g., two consecutive occurrences of the error).

In another embodiment, two-bit version IDs are used to allow the detection of any number of consecutive phantom write errors that is not a multiple of four. In yet another embodiment, larger version IDs (e.g., three- or four-bit version IDs) can be used to detect more back-to-back errors. In yet another embodiment, version IDs can store unique identifiers of data block versions (e.g., timestamps or version numbers).

In one embodiment, the size of version IDs is determined by balancing memory constraints and frequency of consecutive phantom write errors in a particular data storage system.

Figure 3:
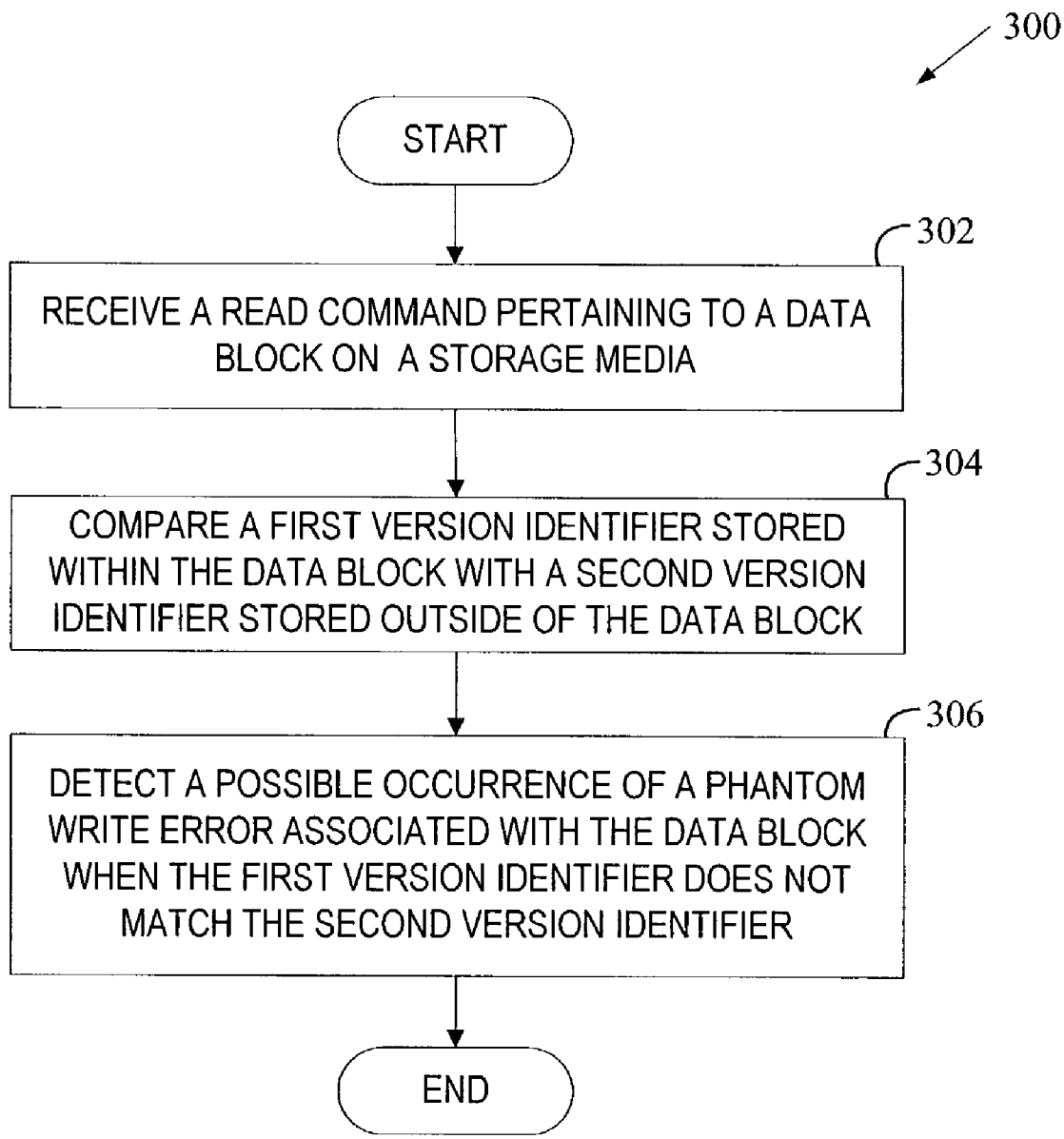
FIG. 3 is a flow diagram of one embodiment of a method for detecting phantom write errors.

FIG. 3 is a flow diagram of one embodiment of a method 300 for detecting phantom write errors. The method may be performed by processing logic that may comprise hardware (e.g., circuitry, dedicated logic, etc.), software (such as run on a general purpose computer system or a dedicated machine), or a combination of both.

Method 300 begins with processing logic receiving a read command pertaining to a data block stored on a storage medium (processing block 302). In response to the read command, processing logic reads version identifiers associated with the data block. As described above, the first version identifier is stored with data in the data block, and the second version identifier is stored outside of the data block. In one embodiment, the second version identifier is stored in a non-volatile storage such as NVRAM or flash memory. This non-volatile storage may be contained in the array controller, a server, a host system, or any other device within the datapath, as described in more detail above. In another embodiment, the second version identifier is stored in the disk array, independently from the data block. In this embodiment, the data structure containing second version identifiers can be cached in volatile memory to reduce the number of disk I/O operations. It should be noted that any other non-volatile storage device can be used to store second version identifiers.

Next, processing logic compares the first version identifier and the second version identifier (processing block 304) and detects the possible occurrence of a phantom write error if the two version identifiers do not match (processing block 306). Further, in one embodiment, processing logic considers the mismatch to be caused by a phantom write error and returns a phantom write error message (with or without the data). In an alternative embodiment, processing logic performs further analyses to determine the actual cause of the mismatch as will be described in greater detail below.

Figure 4:
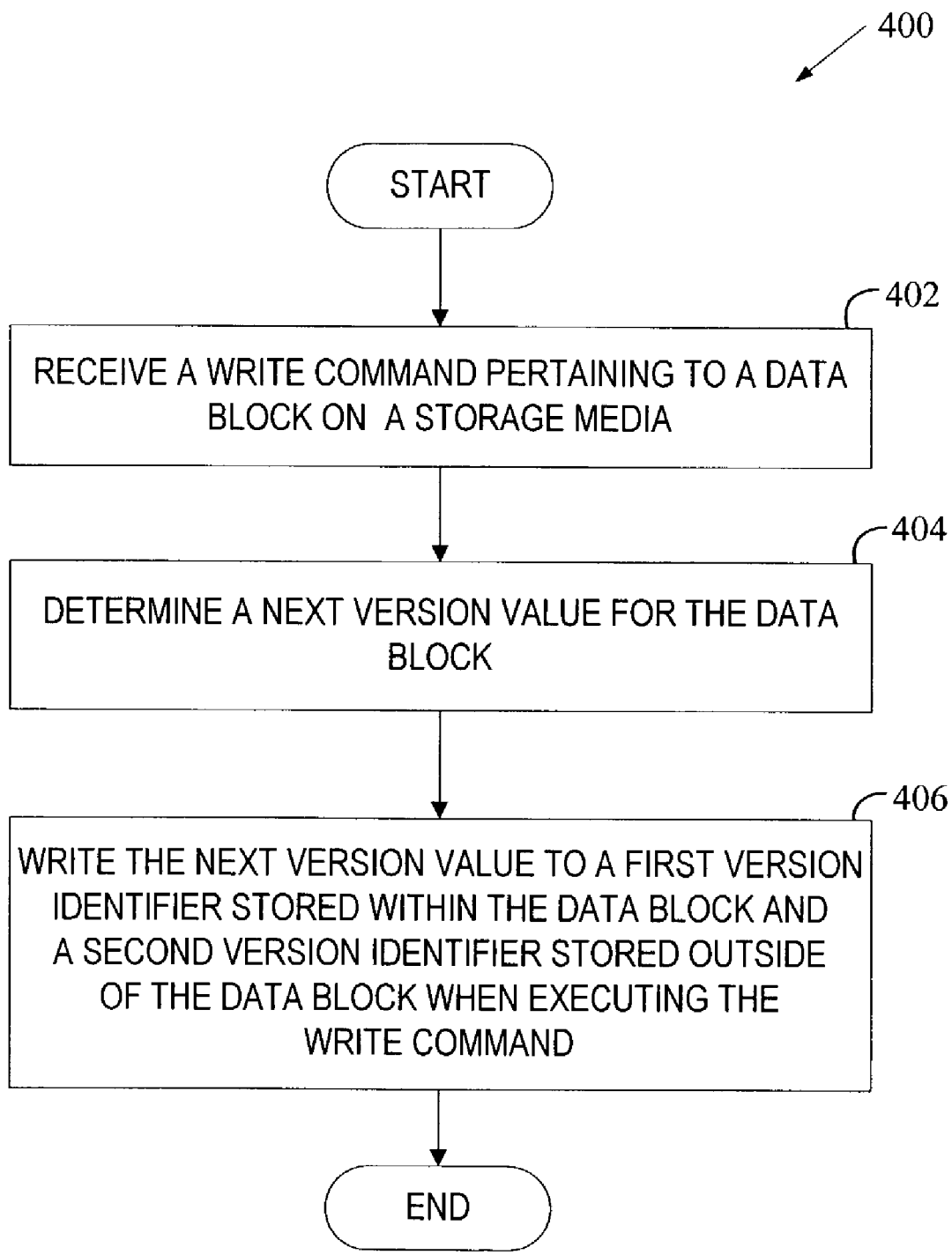
FIG. 4 is a flow diagram of one embodiment of a method for maintaining version identifiers that allow the detection of phantom write errors.

FIG. 4 is a flow diagram of one embodiment of a method 400 for maintaining version identifiers that allow the detection of possible occurrences of phantom write errors. The method may be performed by processing logic that may comprise hardware (e.g., circuitry, dedicated logic, etc.), software (such as run on a general purpose computer system or a dedicated machine), or a combination of both.

Method 400 begins with processing logic receiving a write command pertaining to a data block stored on a storage medium (processing block 402). Next, processing logic determines a next version value for the data block (processing block 404) as will be described in more detail below. Further, processing logic writes the next version value to a first version identifier stored within the data block and a second version identifier stored outside of the data block when executing the write command (processing block 406). If the write command has executed, both version identifiers will match. Alternatively, if the write command has not been executed due to a phantom write error, the first version identifier is not updated, causing a mismatch between the two version identifiers. This mismatch will indicate the possible occurrence of a phantom write error during subsequent operations (e.g., during the execution of a read command).

In one embodiment, processing logic determines the next version value at processing block 404 by reading a first version identifier stored within the data block and a second version identifier stored outside of the data block, determining that the two version identifiers match, and then incrementing their value by one.

In another embodiment, processing logic performs fewer operations when determining the next version value at processing block 404. In this embodiment, the assumption is made that the version identifiers match, and processing logic determines the next version value by reading the second version identifier and incrementing it by one to calculate the next version value. As a result, the above approach will fail to provide an indication of a phantom write error in the case of a dual phantom write error (e.g., if the execution of the current write results in a phantom write error and the execution of a previous write to this data block has also resulted in a phantom write error). However, this type of error combination is expected to be extremely unlikely.

Figure 5:
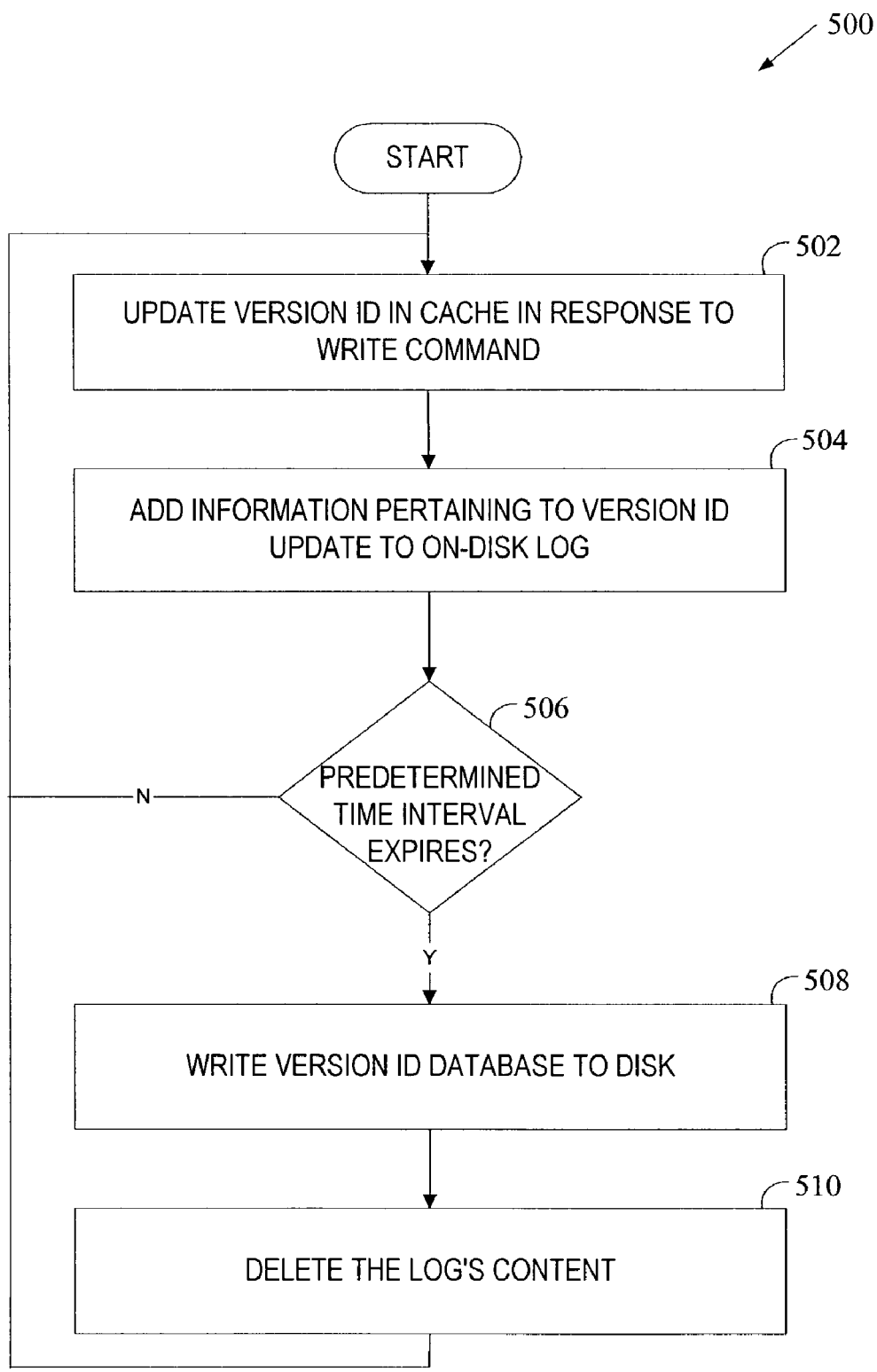
FIG. 5 is a flow diagram of one embodiment of a method for maintaining version identifiers in volatile memory.

In one embodiment, the version identifiers that are not embedded within data blocks are stored on disk (e.g., if the size of non-volatile storage such as NVRAM or flash memory is not large enough to store all of them). In this embodiment, these version identifiers can be cached in volatile memory to reduce the number of disk I/O operations. FIG. 5 is a flow diagram of one embodiment of a method 500 for maintaining version identifiers in volatile memory. Method 500 may be performed by processing logic that may comprise hardware (e.g., circuitry, dedicated logic, etc.), software (such as run on a general purpose computer system or a dedicated machine), or a combination of both.

Method 500 begins with processing logic updating a version identifier in cache in response to a write command pertaining to a corresponding data block (processing block 502). The cache in volatile memory may contain various kinds of data structures for storing version identifiers. For example, the cache may contain a database of version identifiers, a file including identifiers of data blocks and corresponding version identifiers, a bitmap that contains one or more bits (depending on the size of a version identifier) corresponding to each version identifier, etc.

In addition to updating the version identifier in the cache, processing logic adds information pertaining to a version identifier update to a log residing on a disk (processing block 504). This information may include an identifier of a data block, a corresponding version identifier, the time of the update, and any other information. The log is needed for restoring values of version identifiers in case of an unintentional shutdown of the data storage system.

At predetermined time intervals (decision box 506), processing logic writes all the version identifiers to a disk (processing block 508). As a result, random write operations caused by updates of version identifiers are converted into a set of scheduled sequential write operations. Once the version identifiers are written to the disk, processing logic deletes the content of the log (processing block 510) and returns to processing block 502.

As described above, once a mismatch between two version identifiers associated with a data block is detected, two approaches can be taken for determining the cause of the mismatch. With the first approach, the assumption is made that the cause of the mismatch is a phantom write error. This approach is based on empirical data which demonstrates the high likelihood of a phantom write error causing the mismatch. With the second approach illustrated in FIGS. 6A and 6B, further analyses are performed to determine the actual cause of the mismatch.

Figure 6A:
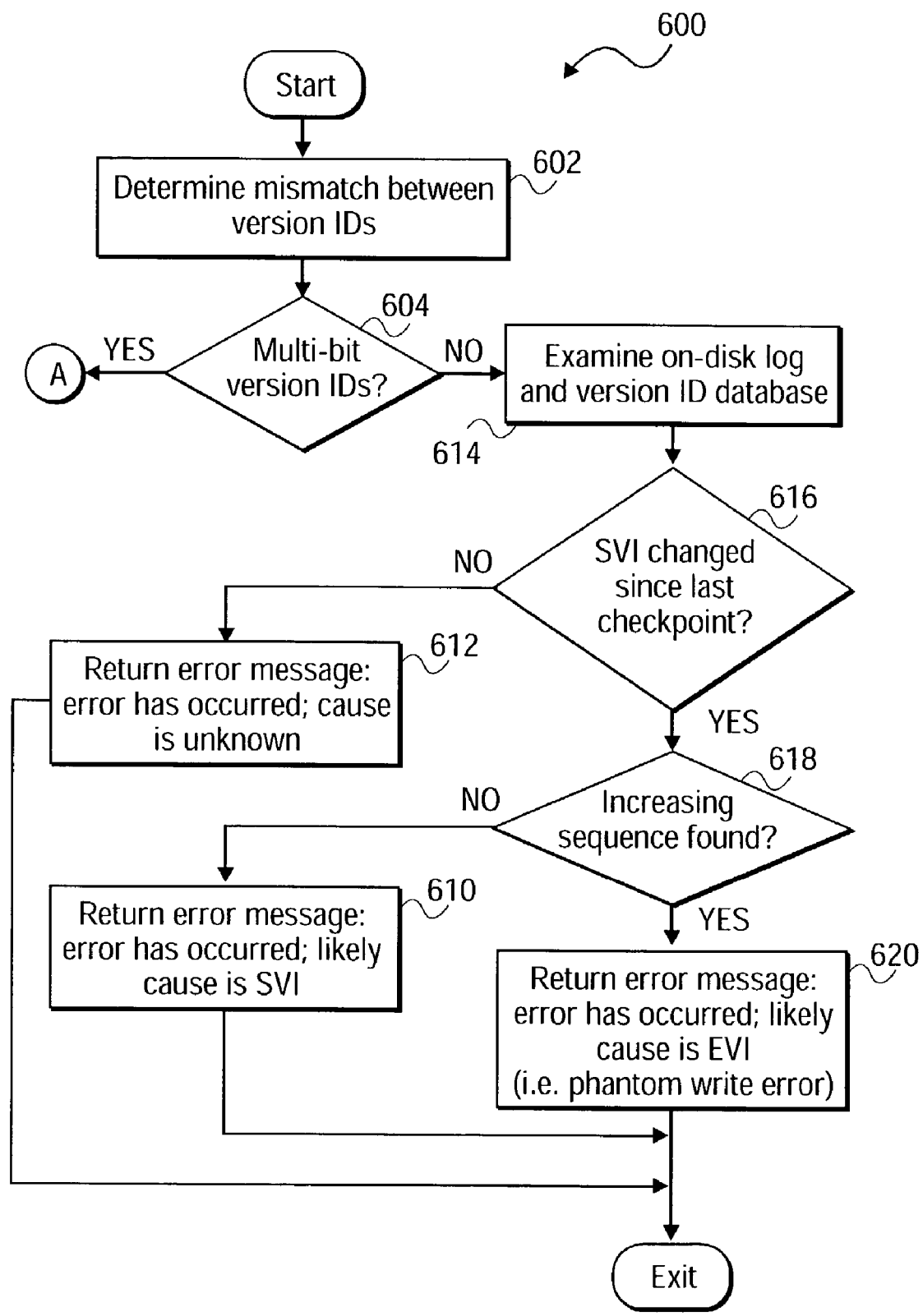
FIGS. 6A and 6B are flow diagrams of one embodiment of a method for determining a cause of a mismatch between version identifiers associated with a data block.
Figure 6B:
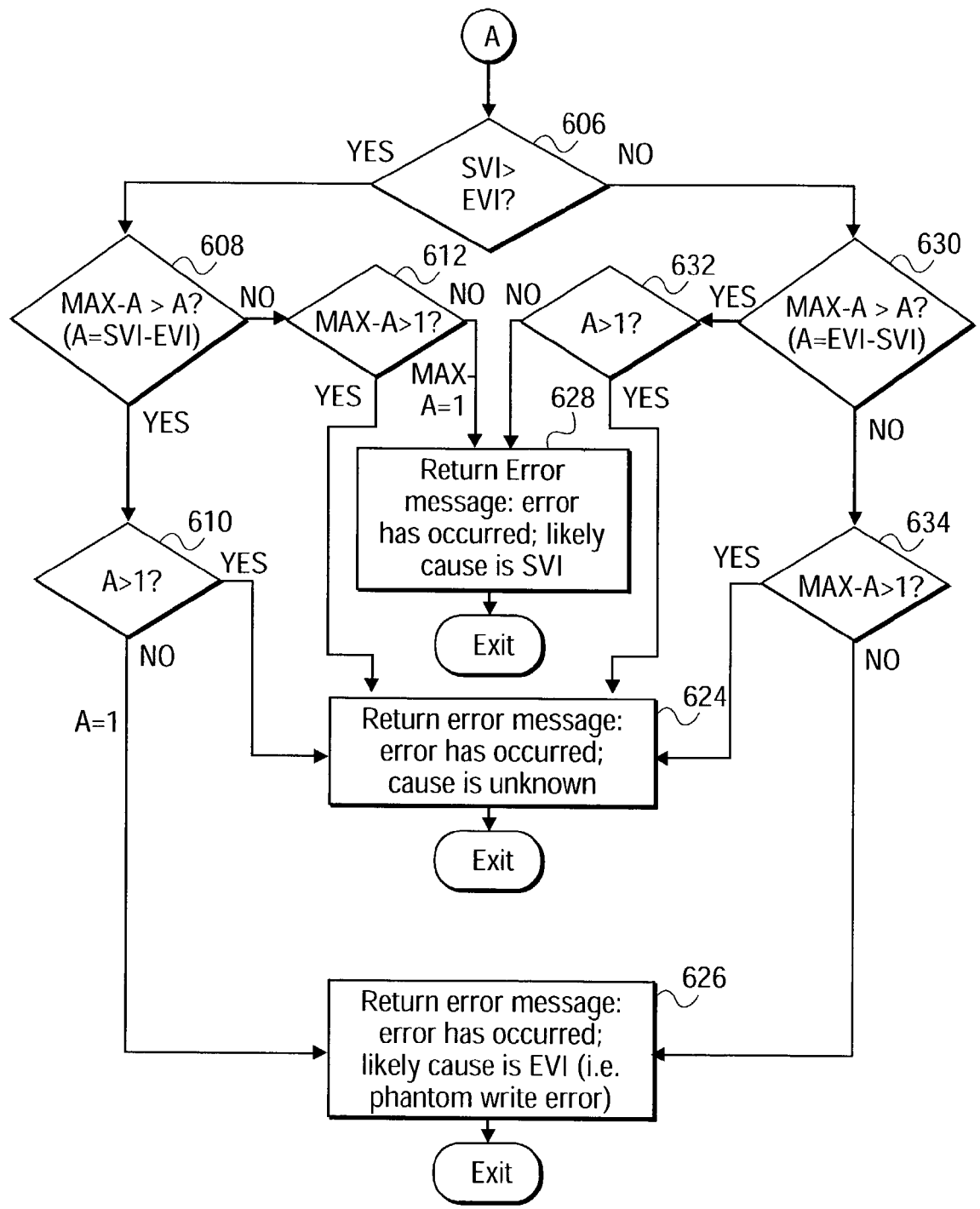

FIGS. 6A and 6B illustrate a flow diagram of one embodiment of a method 600 for determining a cause of a mismatch between version identifiers associated with a data block. The method may be performed by processing logic that may comprise hardware (e.g., circuitry, dedicated logic, etc.), software (such as run on a general purpose computer system or a dedicated machine), or a combination of both.

Method 600 begins at processing block 602 with processing logic determining a mismatch between a version identifier stored with the data block (i.e., an embedded version identifier (EVI)) and a version identifier stored outside of the data block (i.e., a separated version identifier (SVI)). The mismatch may occur in response to the following events: the occurrence of a phantom write error causing the data block containing the EVI to become stale or a corruption of the EVI or SVI. The EVI is embedded in the block and as such is protected by the other integrity metadata (e.g., checksum) in the block. Thus, at the time the mismatch is detected, the EVI is either correct or stale due to a phantom write error. The SVI, however, can become corrupted after it is created. Accordingly, the mismatch can be caused either by a phantom write error or a corruption of the SVI. Processing logic attempts to determine which of the two events has caused the mismatch by examining both the EVI and SVI.

If processing logic determines at decision box 604 that the versions IDs are not multi-bit versions IDs (i.e., the EVI and SVI are one bit in length), processing logic examines an on-disk log and a version ID database (described above in conjunction with FIG. 5) and makes a determination at decision box 616 as to whether the SVI has changed since the last checkpoint. If processing logic determines at decision box 616 that the SVI has changed since the last checkpoint, processing logic further determines whether an increasing sequence can be found for the SVI in the log (decision box 618). If the determination made at decision box 618 is positive, there is a high likelihood that the SVI is correct. Therefore, the likely cause of the error is the EVI, which indicates the occurrence of a phantom write error. Accordingly, processing logic returns an error message that an error has occurred and its likely cause is the EVI (processing block 620). Otherwise, if an increasing sequence was not found at decision box 618, there is a high likelihood that the SVI was corrupted. Accordingly, processing logic returns an error message that an error has occurred and its likely cause is the SVI (processing block 610). It should be noted that the log-based error detection described herein with reference to processing blocks 616 through 620 is not limited to one-bit version identifiers and can be used for multi-bit version identifiers as well.

Alternatively, if the determination made at decision box 616 is negative (i.e., the SVI has not changed since the last checkpoint), then in one embodiment, processing logic returns an error message indicating that an error has occurred and its cause is unknown. In another embodiment, processing logic may label the error a phantom write error or pass the problem to a more general diagnosis module.

If processing logic determines that the versions IDs are more than one bit in length (decision box 604), further analysis of the mismatch cause is performed. This analysis is performed using the "update difference" between the SVI and the EVI. The "update difference" is the number of updates (write operations or generation ID increments) that would be required to go from one of the generation IDs to the other. The "update difference" or "distance" between the two generation IDs is determined using the value referred to herein as MAX which represents the number of increments that should be taken before a generation ID wraps around to the starting value. For example, a two-bit generation ID that takes the values of 0, 1, 2 and 3 would have a MAX value of 4.

As shown in FIG. 6B, if the SVI is greater than the EVI (decision box 606), processing logic determines at decision box 608 whether the difference between MAX and A is greater than A, where A represents the difference between the SVI and the EVI, i.e., A=SVI−EVI. This determination is made to compare the update difference occurred if the outer path was taken (i.e., the number of updates required to go from the SVI to MAX and further from 0 to the EVI) with the update difference occurred if the inner path was taken (i.e., the number of updates required to go from the EVI to the SVI). In one embodiment, the recovery/diagnosis algorithm is optimistic and selects the smaller update difference. That is, if the determination made at decision box 608 is positive, the update difference is assumed to be equal to A. Otherwise, the update difference is assumed to be equal to MAX−A.

If the update difference is assumed to be equal to A, then processing logic determines whether A is greater than 1 (decision box 610). If the determination is negative, i.e., A is equal to 1, then processing logic returns an error message indicating that an error has occurred and its likely cause is the EVI (processing block 626). If the determination made at decision box 610 is positive, i.e., the update difference A is greater than 1, then processing logic returns an error message indicating that an error has occurred and its cause is unknown (processing block 624).

If the update difference is assumed to be equal to MAX−A, then processing logic determines whether MAX−A is greater than 1 (decision box 612). If the determination is negative, i.e., MAX−A is equal to 1, then there is a high likelihood that the SVI has been corrupted. Thus, processing logic returns an error message indicating that an error has occurred and its likely cause is the SVI (processing block 628). If the determination made at decision box 612 is positive, i.e., the update difference MAX−A is greater than 1, then processing logic returns an error message indicating that an error has occurred and its cause is unknown (processing block 624).

If processing logic determines at decision box 606 that the EVI is greater than the SVI, processing logic determines at decision box 630 whether the difference between MAX and A is greater than A, where A=EVI−SVI. This determination is made to compare the update difference occurred if the outer path was taken (i.e., the number of updates required to go from the EVI to MAX and further from 0 to the SVI) with the update difference occurred if the inner path was taken (i.e., the number of updates required to go from the SVI to the EVI). In one embodiment, the recovery/diagnosis algorithm is optimistic and selects the smaller update difference. That is, if the determination made at decision box 630 is positive, the update difference is assumed to be equal to A. Otherwise, the update difference is assumed to be equal to MAX−A.

If the update difference is assumed to be equal to A, then processing logic determines whether A is greater than 1 (decision box 632). If the determination is negative, i.e., A is equal to 1, then processing logic returns an error message indicating that an error has occurred and its likely cause is the SVI (processing block 628). If the determination made at decision box 632 is positive, i.e., the update difference A is greater than 1, then processing logic returns an error message indicating that an error has occurred and its cause is unknown (processing block 624).

If the update difference is assumed to be equal to MAX−A, then processing logic determines whether MAX−A is greater than 1 (decision box 634). If the determination is negative, i.e., MAX−A is equal to 1, then there is a high likelihood that a phantom write error has occurred. Thus, processing logic returns an error message indicating that an error has occurred and its likely cause is the EVI (processing block 626). If the determination made at decision box 634 is positive, i.e., the update difference MAX−A is greater than 1, then processing logic returns an error message indicating that an error has occurred and its cause is unknown (processing block 624).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for detecting phantom write errors in a data storage system comprising: receiving a read command pertaining to a data block stored on a storage medium; comparing a first version identifier stored within the data block with a second version identifier stored outside of the data block; and detecting a possible occurrence of a phantom write error associated with the data block when the first version identifier does not match the second version identifier.

2. The method of claim 1 further comprising: reading the first version identifier and the second version identifier upon receiving the read command.

3. The method of claim 1 wherein each of the first version identifier and the second version identifier includes one bit of data.

4. The method of claim 1 wherein each of the first version identifier and the second version identifier includes two bits of data.

5. The method of claim 1 wherein the second version identifier is stored in a non-volatile storage device.

6. The method of claim 1 wherein the second version identifier is stored on disk and cached in volatile memory.

7. The method of claim 1 further comprising: sending data requested by the read command to a user if the first version identifier matches the second version identifier.

8. The method of claim 1 further comprising: updating the first version identifier and the second version identifier when executing a write command pertaining to the data block.

9. The method of claim 1 further comprising: sending a phantom write error message to a user upon detecting a possible occurrence of the phantom write error.

10. The method of claim 1 further comprising: determining whether the mismatch between the first version identifier and the second version identifier was likely caused by the phantom write error or a corrupted second version identifier; and sending an error message identifying the likely cause of the mismatch to a user.

11. A method for detecting phantom write errors in a data storage system comprising: receiving a write command pertaining to a data block stored on a storage medium; determining a next version value for the data block; and writing the next version value to a first version identifier stored within the data block and a second version identifier stored outside of the data block when executing the write command, the first version identifier and the second version identifier being maintained to detect a possible occurrence of a phantom write error associated with the data block.

12. The method of claim 11 wherein determining the next version value comprises: reading the second version identifier; and incrementing the second version identifier by one.

13. The method of claim 11 wherein each of the first version identifier and the second version identifier includes one bit of data.

14. The method of claim 11 wherein each of the first version identifier and the second version identifier includes two bits of data.

15. The method of claim 11 wherein the second version identifier is stored in a non-volatile storage device.

16. The method of claim 11 wherein writing the next version value to the second version identifier comprises: updating the second version identifier in a version identifier database residing in volatile memory; and adding information pertaining to the second version identifier to a log structure residing on a disk.

17. The method of claim 16 further comprising: writing the version identifier database to a non-volatile storage device at predefined time intervals; and deleting content of the log structure each time the version identifier database is written to the non-volatile storage device.

18. A tangible machine-readable medium containing executable instructions which, when executed by a processing system, cause the processing system to perform a method, the method comprising: receiving a read command pertaining to a data block stored on a storage medium; comparing a first version identifier stored within the data block with a second version identifier stored outside of the data block; and detecting a possible occurrence of a phantom write error associated with the data block when the first version identifier does not match the second version identifier.

19. The tangible machine-readable medium of claim 18 wherein the method further comprises: reading the first version identifier and the second version identifier upon receiving the read command.

20. The tangible machine-readable medium of claim 18 wherein each of the first version identifier and the second version identifier includes one bit of data.

21. A tangible machine-readable medium containing executable instructions which, when executed by a processing system, cause the processing system to perform a method, the method comprising: receiving a write command pertaining to a data block stored on a storage medium; determining a next version value for the data block; and writing the next version value to a first version identifier stored within the data block and a second version identifier stored outside of the data block when executing the write command, the first version identifier and the second version identifier being maintained to detect a possible occurrence of a phantom write error associated with the data block.

22. The tangible machine-readable medium of claim 21 wherein determining the next version value comprises: reading the second version identifier; and incrementing the second version identifier by one.

23. The tangible machine-readable medium of claim 21 wherein each of the first version identifier and the second version identifier includes one bit of data.

24. The tangible machine-readable medium of claim 21 wherein the second version identifier is stored in a non-volatile storage device.

25. The tangible machine-readable medium of claim 21 wherein writing the next version value to the second version identifier comprises: updating the second version identifier in a version identifier database residing in volatile memory; and adding information pertaining to the second version identifier to a log structure residing on a disk.

26. The tangible machine-readable medium of claim 25 wherein the method further comprises: writing the version identifier database to a non-volatile storage device at predefined time intervals; and deleting content of the log structure each time the version identifier database is written to the non-volatile storage device.

27. An apparatus comprising: means for receiving a read command pertaining to a data block stored on a storage medium; means for comparing a first version identifier stored within the data block with a second version identifier stored outside of the data block; and means for detecting a possible occurrence of a phantom write error associated with the data block when the first version identifier does not match the second version identifier.

28. An apparatus comprising: means for receiving a write command pertaining to a data block stored on a storage medium; means for determining a next version value for the data block; and means for writing the next version value to a first version identifier stored within the data block and a second version identifier stored outside of the data block when executing the write command, the first version identifier and the second version identifier being maintained to detect a possible occurrence of a phantom write error associated with the data block.

29. A data storage system comprising: a processing system; and a memory coupled to the processing system, the memory storing instructions, which when executed by the processing system, cause the processing system to perform the operations of a) receiving a read command pertaining to a data block stored on a storage medium, b) comparing a first version identifier stored within the data block with a second version identifier stored outside of the data block, and c) detecting an occurrence of a phantom write error associated with the data block when the first version identifier does not match the second version identifier.

30. A data storage system comprising: a processing system; and a memory coupled to the processing system, the memory storing instructions, which when executed by the processing system, cause the processing system to perform the operations of a) receiving a write command pertaining to a data block stored on a storage medium, b) determining a next version value for the data block, and c) writing the next version value to a first version identifier stored within the data block and a second version identifier stored outside of the data block when executing the write command, the first version identifier and the second version identifier being maintained to detect an occurrence of a phantom write error associated with the data block.

* * * * *